United States Patent
Chong et al.

(10) Patent No.: US 11,621,576 B2
(45) Date of Patent: Apr. 4, 2023

(54) DEVICE AND METHOD FOR REDUCING CURRENT OVERSHOOT IN A POWER REGULATOR

(71) Applicant: Renesas Electronics America Inc., Milpitas, CA (US)

(72) Inventors: Han Chong, Milpitas, CA (US); Sungkeun Lim, Milpitas, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 286 days.

(21) Appl. No.: 17/131,553

(22) Filed: Dec. 22, 2020

(65) Prior Publication Data

US 2022/0200322 A1 Jun. 23, 2022

(51) Int. Cl.
- *H02J 7/00* (2006.01)
- *H02J 7/06* (2006.01)
- *H02M 3/155* (2006.01)
- *H02J 50/10* (2016.01)

(52) U.S. Cl.
CPC .............. *H02J 7/06* (2013.01); *H02J 7/0029* (2013.01); *H02J 50/10* (2016.02); *H02M 3/155* (2013.01)

(58) Field of Classification Search
CPC ..................................................... H02J 7/0029
USPC ......................................................... 320/108
See application file for complete search history.

(56) References Cited

U.S. PATENT DOCUMENTS

| | | | |
|---|---|---|---|
| 2003/0048648 A1* | 3/2003 | Lin | H02M 3/33592 363/65 |
| 2014/0203763 A1* | 7/2014 | Zhao | H02J 7/00711 320/162 |

* cited by examiner

*Primary Examiner* — Edward Tso
*Assistant Examiner* — Ahmed H Omar
(74) *Attorney, Agent, or Firm* — Foley & Lardner LLP

(57) ABSTRACT

Example implementations include a method of reducing current overshoot in a power regulator device, by detecting a change in an input current of an inductive charger device in response to a change in load on the inductive charger device, modifying an operating state of the inductive charger device in accordance with a first input current limit parameter based on a total input current limit parameter and a current division parameter, in response to the detecting the change in the input current, operating the inductive charger device in accordance with the first input current limit during a current limit period subsequent to the detecting the change in the input current, modifying the operating state of the inductive charger device in accordance with a second input current limit parameter based on the total input current limit parameter and the current division parameter, subsequent to the current limit period, and operating the inductive charger device in accordance with the second input current limit subsequent to the current limit period.

20 Claims, 7 Drawing Sheets

DEVICE AND METHOD FOR REDUCING CURRENT OVERSHOOT IN A POWER REGULATOR

TECHNICAL FIELD

The present implementations relate generally to electrical chargers, and more particularly to reducing current overshoot in a power regulator.

BACKGROUND

Electronic devices are increasingly ubiquitous in many individual and interpersonal activities. In addition, electronic devices are increasingly exposed to use including unpredictable changes to power delivery, consumption, and the like driven by the proliferation of mobile device architectures and peripheral devices, among others. Conventional systems, however, may not effectively accommodate various rapid changes, overshoots, or spikes in power characteristics in response to changes in load requirements. Thus, a technological solution for reducing current overshoot in a power regulator is desired.

SUMMARY

Example implementations include a method of reducing current overshoot in a power regulator device, by detecting a change in an input current of an inductive charger device in response to a change in load on the inductive charger device, modifying an operating state of the inductive charger device in accordance with a first input current limit parameter based on a total input current limit parameter and a current division parameter, in response to the detecting the change in the input current, operating the inductive charger device in accordance with the first input current limit during a current limit period subsequent to the detecting the change in the input current, modifying the operating state of the inductive charger device in accordance with a second input current limit parameter based on the total input current limit parameter and the current division parameter, subsequent to the current limit period, and operating the inductive charger device in accordance with the second input current limit subsequent to the current limit period.

Example implementations also include a power regulator device with an inductive charger device, a limit magnitude controller device operatively coupled to the inductive charger device and configured to modify an operating state of the inductive charger device in accordance with a first input current limit parameter in response to a change in an input current, the first input current parameter being based on a total input current limit parameter and a current division parameter, a step magnitude controller device operatively coupled to the inductive charger device and configured to modify the operating state of the inductive charger device in accordance with a second input current limit parameter subsequent to the current limit period, the second input current limit parameter being based on the total input current limit parameter and the current division parameter, and a loop selector device operatively coupled to the inductive charger device, the limit magnitude controller device, and the step magnitude controller device, and configured to detect the change in the input current of the inductive charger device in response to a change in load on the inductive charger device, operate the inductive charger device in accordance with the first input current limit during a current limit period subsequent to the change in the input current, and operate the inductive charger device in accordance with the second input current limit subsequent to the current limit period.

Example implementations also include a power regulator system with an inductive charger device, a limit magnitude controller device operatively coupled to the inductive charger device and configured to modify an operating state of the inductive charger device in accordance with a first input current limit parameter in response to a change in an input current, the first input current parameter being based on a total input current limit parameter and a current division parameter, a step magnitude controller device operatively coupled to the inductive charger device and configured to modify the operating state of the inductive charger device in accordance with a second input current limit parameter subsequent to the current limit period, the second input current limit parameter being based on the total input current limit parameter and the current division parameter, a loop selector device operatively coupled to the inductive charger device, the limit magnitude controller device, and the step magnitude controller device, and configured to detect the change in the input current of the inductive charger device in response to a change in load on the inductive charger device, operate the inductive charger device in accordance with the first input current limit during a current limit period subsequent to the change in the input current, and operate the inductive charger device in accordance with the second input current limit subsequent to the current limit period, and a step delay device operatively coupled to the loop selector device and configured to retrievably store a step delay parameter, where the current limit period is based on the step delay parameter.

BRIEF DESCRIPTION OF THE DRAWINGS

These and other aspects and features of the present implementations will become apparent to those ordinarily skilled in the art upon review of the following description of specific implementations in conjunction with the accompanying figures, wherein.

DETAILED DESCRIPTION

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

Figure 1:
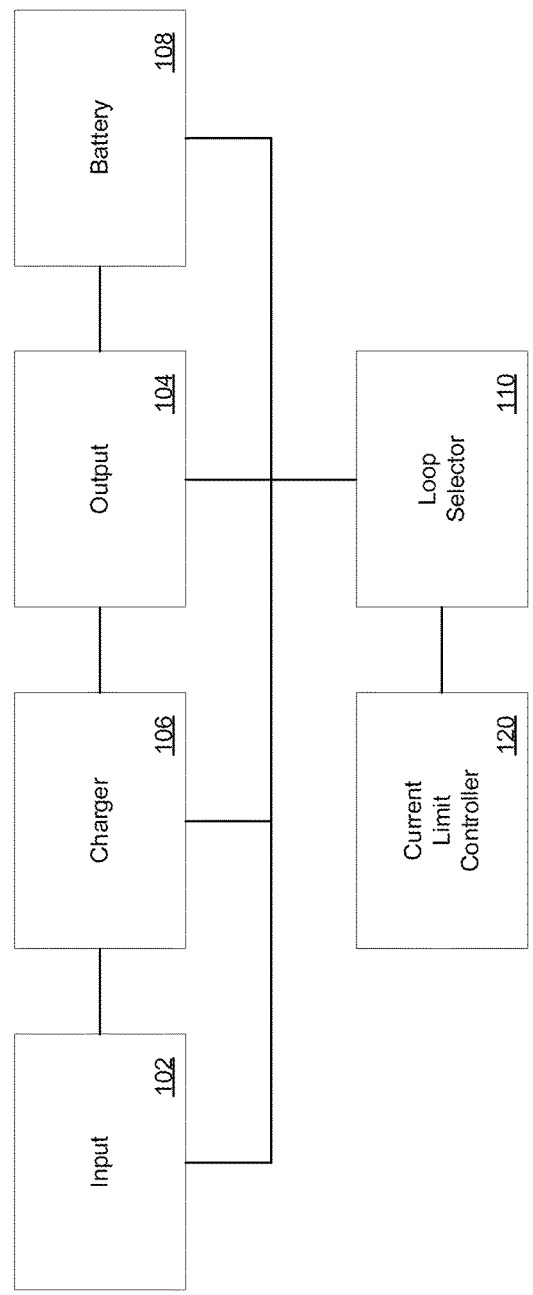
FIG. 1 illustrates an example power regulator system, in accordance with present implementations.

FIG. 1 illustrates an example power regulator system, in accordance with present implementations. As illustrated by way of example in FIG. 1, an example power regulator system 100 includes an input 102, an output 104, a charger 106, a battery 108, a loop selector 110, and a current limit controller 120.

The input 102 is, includes, is operably couplable to, is integrated with, is integrable with, or the like, a source of electrical power, voltage, current, or the like for supplying power to the example power regulator system 100. In some implementations, the input 102 includes, but is not limited to regulated 120 V AC power, regulated 220V AC power, 5V DC power, 12V DC power, 20V DC power, or the like. In some implementations, the input 102 includes a wired power connection, a wireless direct contact power connection, a wireless and contactless power connection, the like, or any power connection as is known or may become known. In some implementations, the input 102 includes one or more USB terminals or ports (e.g., USB-C, USB-PD).

The output 104 includes one or more electrical, electronic, electromechanical, electrochemical, or like devices or systems for receiving power, voltage, current, or the like from one or more of the charger 106 and the battery 108 to perform one or more actions. In some implementations, the output 104 includes at least one battery, electronic display, electronic computer, electronic input device, electromechanical input device, electronic output device, electromechanical output device or the like. Examples of these devices include notebook computers, desktop computers, tablets, smartphones, printers, scanners, telephony endpoints, videoconferencing endpoints, keyboards, mice, trackpads, gaming peripherals, monitors, televisions, and the like. In some implementations, the output 104 includes one or more devices partially or fully separable from the example power regulator system 100. In some implementations, the output 104 includes one or more devices partially or fully integrated or integrable into, or separable from, the example power regulator system 100.

The charger 106 includes one or more one or more electrical, electronic, electromechanical, electrochemical, or like devices or systems for charging or discharging a load operatively coupled or the like to the output 104. In some implementations, the charger 106 includes a DC-DC power converter. In some implementations, the charger 106 includes an inductive charger. An inductive charger may be, but is not limited to, a buck charger, a boost charger, a buck-boost charger, a combination thereof, or the like.

The battery 108 includes one or more electrical, electronic, electromechanical, electrochemical, or like devices or systems for at least one of receiving, storing and distributing input power. In some implementations, the battery 108 includes one or more stacks of batteries. In some implementations, the battery 108 includes lithium-ion or like energy storage. In some implementations, the battery 108 is integrated with, integrable with, or separable from the example power regulator system 100. In some implementations, the battery 108 includes a plurality of battery units variously or entirely integrated with, integrable with, or separable from the example power regulator system 100.

In some implementations, the example power regulator system 100 includes at least one system processor operable to execute one or more instructions associated therewith. In some implementations, the system processor is an electronic processor, an integrated circuit, or the like including one or more of digital logic, analog logic, digital sensors, analog sensors, communication buses, volatile memory, nonvolatile memory, and the like. In some implementations, the system processor includes but is not limited to, at least one microcontroller unit (MCU), microprocessor unit (MPU), central processing unit (CPU), graphics processing unit (GPU), physics processing unit (PPU), embedded controller (EC), or the like. In some implementations, the system processor includes a memory operable to store or storing one or more instructions for operating components of the system processor and operating components operably coupled to the system processor. In some implementations, the one or more instructions include at least one of firmware, software, hardware, operating systems, embedded operating systems, and the like. It is to be understood that the system processor generally can include at least one communication bus controller to effect communication between the system processor and the other elements of the example power regulator system 100.

The loop selector 110 is operable to operate the charger 106 in accordance with one or more regulation modes and in accordance with one or more current limit conditions. In some implementations, the loop selector 110 includes one or more logical devices or the like to control operation of the charger 106 in one or more of a buck mode, a boost mode, and a buck-boost mode of operation. In some implementations, the logical devices include but are not limited to one or more gate driver circuits each operatively coupled to at least one transistor of the charger 106. In some implementations, the logical devices includes but are not limited to a driver controller operable to switch one or more transistors of the charger 106 between activated or "on" states and deactivated or "off" states. In some implementations, the loop selector 110 is operable to switch one or more transistors of the charger 106 to maintain at least one electrical characteristic of at least one of the charger 106 and the example power regulator device 100. In some implementations, the electrical characteristic includes a charge current to the battery 108. In some implementations, the electrical characteristic includes an output voltage at one or more of the output 104 and an output of the charger 106. In some implementations, the electrical characteristic includes an input current at one or more of the input 102 and an input of the charger 106. In some implementations, the electrical characteristic includes an input voltage at one or more of the input 102 and an input of the charger 106. In some implementations, the loop selector 110 includes one or more logical or electronic devices including but not limited to integrated circuits, logic gates, flip flops, gate arrays, programmable gate arrays, and the like. It is to be understood that any electrical, electronic, or like devices, or components associated with the loop selector 110 can also be associated with, integrated with, integrable with, replaced by, supplemented by, complemented by, or the like, the system processor or any component thereof.

The current limit controller 120 is operable to apply, control, generate, enforce, implement, or the like at least one limit on current at the input 102. In some implementations, the current limit controller 120 includes at least one non-volatile and nontransitory computer readable medium operable to store at least one current limit characteristic. In some implementations, the medium is or includes at least one gate array, flip-flop, register, accumulator, and the like. In some implementations, the current limit controller 120 operatively coupled to the loop selection by at least one communication line, bus, or the like. In some implementations, the communication line, bus, or the like includes a communication bus includes one or more bits channels, operable to transmit one or more current limit characteristic to the loop selector 110. In some implementations, the current limit controller 120 includes one or more logical devices, arithmetic units, or the like operable to perform one or more mathematical operations, conversions, substitutions, replacements, or the like, with respect to at least one current limit characteristic. As one example, the current limit controller is operable to generate at least one current limit characteristic based on another current limit characteristic stored thereon or retrievable thereby. In some implementations, the current limit controller 120 includes one or more logical or electronic devices including but not limited to integrated circuits, logic gates, flip flops, gate arrays, programmable gate arrays, and the like. It is to be understood that any electrical, electronic, or like devices, or components associated with the current limit controller 120 can also be associated with, integrated with, integrable with, replaced by, supplemented by, complemented by, or the like, the system processor or any component thereof.

Figure 2:
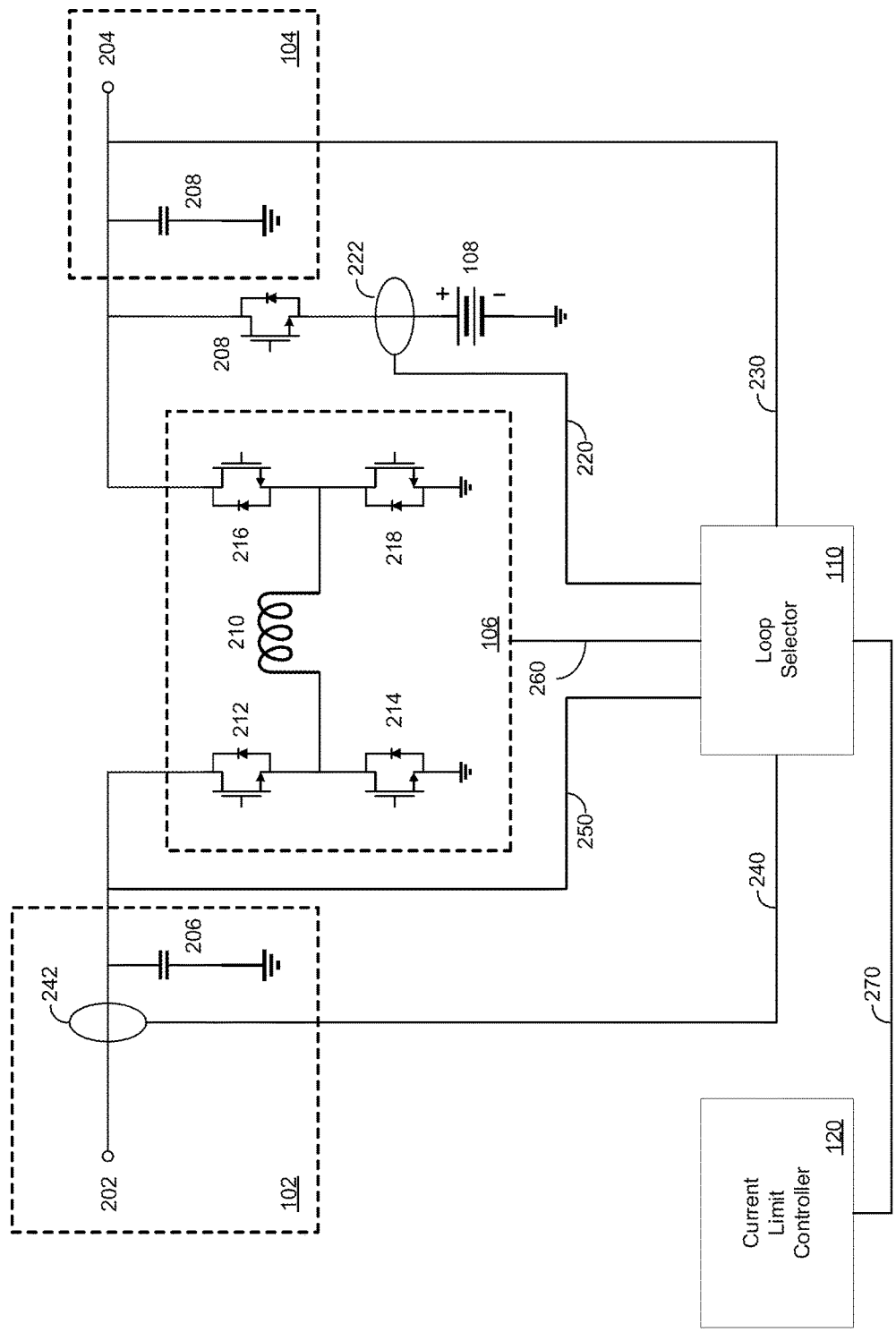
FIG. 2 illustrates an example power regulator device further to the example power regulator system of FIG. 1.

FIG. 2 illustrates an example power regulator device further to the example power regulator system of FIG. 1. As illustrated by way of example in FIG. 2, an example power regulator device 200 includes the input 102, the output 104, the charger 106, the battery 108, a battery transistor 208, the loop selector 110, and the current limit controller 120. In some implementations, the input 102 includes an input node 202. In some implementations, the output 104 includes an output node 204. In some implementations, the charger 106 includes an inductor 210, a high-side buck transistor 212, a low-side buck transistor 214, a high-side boost transistor 216, a low-side boost transistor 218. In some implementations, the loop selector 110 includes a charge current feedback line 220, a charge current sensor 222, an output voltage feedback line 230, an input current feedback line 240, an input current sensor 242, an input voltage feedback line 250, and a charge control line 260. In some implementations, the loop selector 110 is operatively coupled to the current limit controller 120 by a current limit control line 270. It is to be understood that the above elements may be directly connected or indirectly connected by intervening electronic components in accordance with present implementations.

The input node 202 is operable to receive input power from an input operatively coupled thereto and to transmit received input power to the charger 106. In some implementations, the input node 202 is operatively coupled to an input capacitor 206, the input current sensor 232 and drain terminal of the high-side buck transistor 212. The output node 204 is operable to transmit output power to an output operatively coupled thereto and to receive the output power from the charger 106. In some implementations, the output node 204 is operatively coupled to an output capacitor 206, a positive terminal of the battery 108, and a drain terminal of the high-side boost transistor 216.

The inductor 210 is operable in a DC-DC converter mode in one or more of a buck mode, a boost mode and a buck-boost mode. In some implementations, the inductor 210 is operatively coupled at an input node thereof to a source terminal of the high-side buck transistor 212 and a drain terminal of the low-side buck transistor 214. In some implementations, the inductor 210 is operatively coupled at an output node thereof to a source terminal of the high-side boost transistor 216 and a drain terminal of the low-side boost transistor 218. It is to be understood that the inductor node may alternatively be coupled directly to one or more of ground, the input node 202 and the output node 204 in accordance with one or more of a buck configuration, a boost configuration, and a buck-boost configuration. It is to be understood that the charger 106 can operate in a buck-boost mode. It is to be further understood that the charger 106 can optionally include or operate only a subset of the transistors 212, 214, 216 and 218 in accordance with operation in a buck mode or a boost mode. The battery transistor 208 is operable to operatively and switchably couple and decouple battery 108 to at least one of the charger 106, the high-side boost transistor 216, the output node 204. In some implementations, one or more of the battery transistor 208, the high-side buck transistor 212, the low-side buck transistor 214, the high-side boost transistor 216, and the low-side boost transistor 218 are or include field effect transistors ("FETs"), metal oxide semiconductor field effect transistors ("MOSFETs"), and the like.

The charge current feedback line 220 is operable to provide a charge current feedback signal to the loop selector 110 from the charge current sensor 222. The charge current sensor 222 is operable to generate a charge current feedback signal based on at least one of a magnitude and a direction of a battery current flowing to or from the battery 108. In some implementations, the charge current sensor 222 is operable to generate a response voltage having at least one of a magnitude and direction corresponding to a magnitude or a direction of the battery current.

The output voltage feedback line 230 is operable to provide an output voltage feedback signal to the loop selector 110 from the output node 204. In some implementations, the output voltage feedback line 230 is directly and operatively coupled to the output node 204. Alternatively, in some implementations, the output voltage feedback line 230 is operatively coupled to the output node 204 by one or more intervening electrical, electronic, or like devices. As one example, the output voltage feedback line 230 can be operatively coupled to the output node 204 by a voltage divider circuit. In this example, the output voltage feedback line 230 can receive a stepped-down voltage from the voltage divider circuit where the operating range of voltage at the loop selector 110 is less than the operating range of voltage at the output node 204.

The input current feedback line 240 is operable to provide an input current feedback signal to the loop selector 110 from the input current sensor 242. The input current sensor 242 is operable to generate an input current feedback signal based on at least one of a magnitude and a direction of an input current flowing to or from the input node 202. In some implementations, the input current sensor 242 is operable to generate a response voltage having at least one of a magnitude and direction corresponding to a magnitude or a direction of the input current.

The input voltage feedback line 250 is operable to provide an input voltage feedback signal to the loop selector 110 from the input node 202. In some implementations, the input voltage feedback line 250 is directly and operatively coupled to the input node 202. Alternatively, in some implementations, the input voltage feedback line 250 is operatively coupled to the input node 202 by one or more intervening electrical, electronic, or like devices. As one example, the input voltage feedback line 250 can be operatively coupled to the input node 202 by a voltage divider circuit correspondingly to the output voltage feedback line 250 or in place of a corresponding structure associated with the output voltage feedback line 250.

The charger control line 260 is operable to communicatively couple the loop selector 110 to the charger 106. In some implementations, the charger control line 260 is operable to communicate one or more instructions, signals, conditions, states, or the like between one or more of the loop selector 110 and the charger 106. In some implementations, the loop selector 110 is operable to drive one or more of the transistors 212, 214, 216 and 218 of the charger 106 by the charger control line 260. In some implementations, the loop selector 110 is operable to drive one or more of the transistors 212, 214, 216 and 218 of the charger 106 by the charger control line 260 in accordance with at least one of a buck mode, a boost mode, and a buck-boost mode of operation. In some implementations, the loop selector 110 is operable to drive one or more of the transistors 212, 214, 216 and 218 of the charger 106 by the charger control line 260 to maintain at least one electrical characteristic of at least one of the charger 106 and the example power regulator device 100. In some implementations, the charger control line 260 includes one or more digital, analog, or like communication channels, lines, traces, or the like. As one example, the charger control line 260 is or includes at least one serial or parallel communication line among multiple communication lines of a communication interface.

The current limit control line 270 is operable to communicatively couple the loop selector 110 to the current limit controller 120. In some implementations, the current limit control line 270 is operable to communicate one or more instructions, signals, conditions, states, or the like between one or more of the loop selector 110 and the current limit controller 120. In some implementations, the current limit controller 120 is operable to provide to the loop selector 110, by the current limit control line 270, one or more limits on current at the charger 106 based on at least one current limit characteristic. In some implementations, the current limit control line 270 includes one or more digital, analog, or like communication channels, lines, traces, or the like. As one example, the current limit control line 270 is or includes at least one serial or parallel communication line among multiple communication lines of a communication interface.

Figure 3:
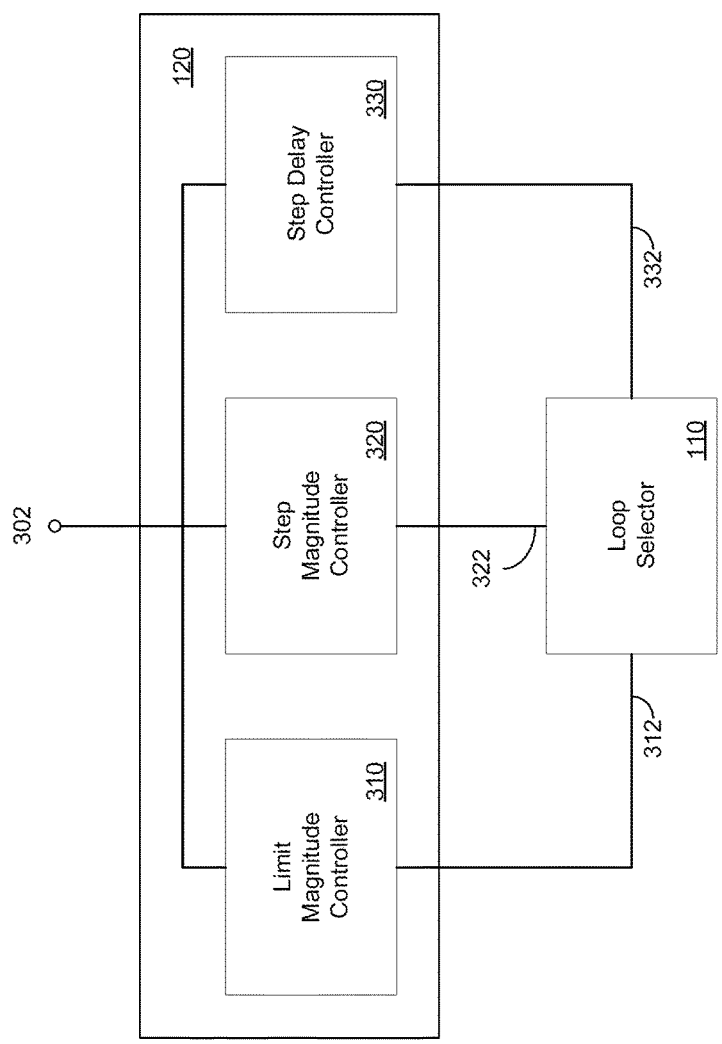
FIG. 3 illustrates an example current limit controller further to the example power regulator system of FIG. 1.

FIG. 3 illustrates an example current limit controller further to the example power regulator system of FIG. 1. As illustrated by way of example in FIG. 3, an example current limit controller 300 includes a control input line 302, a limit magnitude controller 310, a limit magnitude control line 312, a step magnitude controller 320, a step magnitude control line 322, a step delay controller 330, a step delay control line 332.

The control input line 302 is operable to communicatively couple the current limit controller 120 to an external device. In some implementations, the control input line 302 is operable to communicate one or more instructions, signals, conditions, states, or the like from the external device to the current limit controller 120. In some implementations, the current limit controller 120 is operable to receive one or more values or the like from the external device by the control input line 302 to at least one of the limit magnitude controller 310, the step magnitude controller 320, and the step delay controller 330. In some implementations, the control input line 302 is operable to transmit the values in accordance with a flash, download, reset, initialization, or the like, of at least one of the current limit controller 120, the limit magnitude controller 310, the step magnitude controller 320, and the step delay controller 330. As one example, the control input line 302 can receive a current limit parameter, a step magnitude parameter, and a step delay parameter from the external device. In this example, each of the limit magnitude controller 310, the step magnitude controller 320, and the step delay controller 330 can be set with a respective one of the current limit parameter, the step magnitude parameter, and the step delay parameter from the external device. In some implementations, the control input line 302 includes one or more digital, analog, or like communication channels, lines, traces, or the like. As one example, the control input line 302 is or includes at least one serial or parallel communication line among multiple communication lines of a communication interface.

The limit magnitude controller 310 is operable to store, provide, receive, transmit, and the like, a current limit parameter. In some implementations, the limit magnitude controller 310 is operable to store a numeric value representing the current limit parameter. In some implementations, the limit magnitude controller 310 is or includes a physical or logical nontransitory and nonvolatile memory device. In some implementations, the limit magnitude controller 310 is or includes a physical memory device distinct from, separate from one or more of the step magnitude controller 320 and the step delay controller 330. Alternatively, in some implementations, the limit magnitude controller 310 includes a physical memory device integrated with, integrable with, or the like, one or more of the step magnitude controller 320 and the step delay controller 330. In some implementations, the limit magnitude controller 310 includes one or more logical or electronic devices including but not limited to integrated circuits, logic gates, flip flops, gate arrays, programmable gate arrays, and the like. It is to be understood that any electrical, electronic, or like devices, or components associated with the limit magnitude controller 310 can also be associated with, integrated with, integrable with, replaced by, supplemented by, complemented by, or the like, the system processor or any component thereof. The limit magnitude control line 312 is operable to communicatively couple the limit magnitude controller 310 to the loop selector 110. In some implementations, the limit magnitude control line 312 includes one or more digital, analog, or like communication channels, lines, traces, or the like. As one example, the limit magnitude control line 312 is or includes at least one serial or parallel communication line among multiple communication lines of a communication interface.

The step magnitude controller 320 is operable to store, provide, receive, transmit, and the like, a current division parameter. In some implementations, the step magnitude controller 320 is operable to store a numeric value representing the current division parameter. In some implementations, the step magnitude controller 320 is or includes a physical or logical nontransitory and nonvolatile memory device. In some implementations, the step magnitude controller 320 is or includes a physical memory device distinct from, separate from one or more of the limit magnitude controller 310 and the step delay controller 330. Alternatively, in some implementations, the step magnitude controller 320 includes a physical memory device integrated with, integrable with, or the like, one or more of the limit magnitude controller 310 and the step delay controller 330. In some implementations, the step magnitude controller 320 includes one or more logical or electronic devices including but not limited to integrated circuits, logic gates, flip flops, gate arrays, programmable gate arrays, and the like. It is to be understood that any electrical, electronic, or like devices, or components associated with the step magnitude controller 320 can also be associated with, integrated with, integrable with, replaced by, supplemented by, complemented by, or the like, the system processor or any component thereof. The step magnitude control line 322 is operable to communicatively couple the step magnitude controller 320 to the loop selector 110. In some implementations, the step magnitude control line 322 includes one or more digital, analog, or like communication channels, lines, traces, or the like. As one example, the step magnitude control line 322 is or includes at least one serial or parallel communication line among multiple communication lines of a communication interface.

The step delay controller 330 is operable to store, provide, receive, transmit, and the like, a step delay parameter. In some implementations, the step delay controller 330 is operable to store a numeric value representing the step delay parameter. In some implementations, the step delay controller 330 is or includes a physical or logical nontransitory and nonvolatile memory device. In some implementations, the step delay controller 330 is or includes a physical memory device distinct from, separate from one or more of the limit magnitude controller 310 and the step magnitude controller 320. Alternatively, in some implementations, the step delay controller 330 includes a physical memory device integrated with, integrable with, or the like, one or more of the limit magnitude controller 310 and the step magnitude controller 320. In some implementations, the step delay controller 330 includes one or more logical or electronic devices including but not limited to integrated circuits, logic gates, flip flops, gate arrays, programmable gate arrays, and the like. It is to be understood that any electrical, electronic, or like devices, or components associated with the step delay controller 330 can also be associated with, integrated with, integrable with, replaced by, supplemented by, complemented by, or the like, the system processor or any component thereof. The step delay control line 332 is operable to communicatively couple the step delay controller 330 to the loop selector 110. In some implementations, the step delay control line 332 includes one or more digital, analog, or like communication channels, lines, traces, or the like. As one example, the step delay control line 332 is or includes at least one serial or parallel communication line among multiple communication lines of a communication interface. It is to be understood that one or more of the control input line 302, the limit magnitude control line 312, the step magnitude control line 322, and the step delay control line 332 can be arranged as, included in, or the like, a communication bus or the like.

Figure 4:
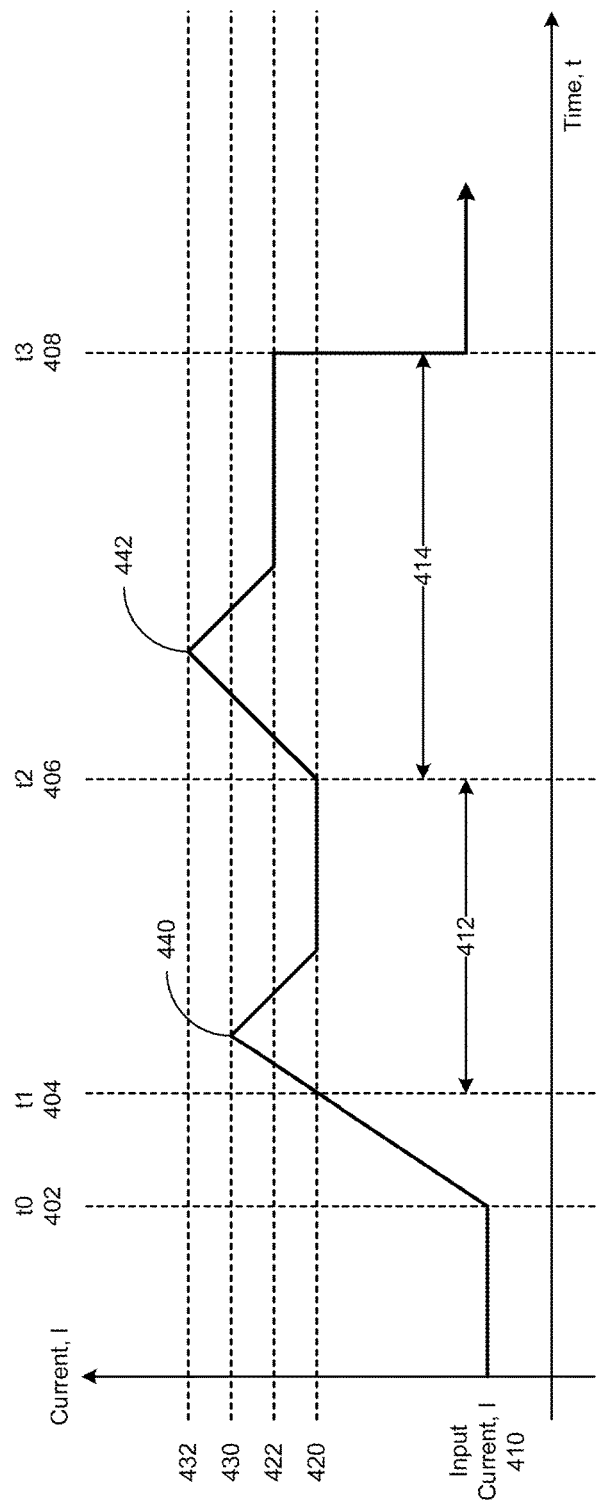
FIG. 4 illustrates an example timing diagram for input current of an example power regulator, in accordance with present implementations.

FIG. 4 illustrates an example timing diagram for input current of an example power regulator, in accordance with present implementations. As illustrated by way of example in FIG. 4, an example timing diagram 400 includes input current waveform 410, a first current limit 420, a second current limit 422, a first current overshoot level 430, and a second current overshoot level 432. In some implementations, the input current waveform 410 includes a first current overshoot peak 440 and a second current overshoot peak 442. In some implementations, the example power regulator operates responsively to load step changes at a system voltage. In some implementations, load step changes occur at arbitrary times in response to connection, disconnection, activation, deactivation, or the like, of one or more electronic, electrical, or like components operatively coupled to the example power regulator. It is to be understood that the timing diagram 400 illustrates an example response to an example operating state. It is to be further understood that the systems and devices in accordance with present implementations are not limited to operation in accordance with timing diagram 400 of FIG. 4.

Before time t0 402, the example power regulator operates in accordance with receiving an input current at a first current level in accordance with the input current waveform 410. In some implementations, the first current level is less than at least one of the first current limit 420, the second current limit 422, the first current overshoot level 430, and the second current overshoot level 432. In some implementations, the first current level is less than all of the first current limit 420, the second current limit 422, the first current overshoot level 430, and the second current overshoot level 432. In some implementations, the input current of the input current waveform 410 remains substantially constant in at least one of a DC component and an AC component before time t0 402.

At time t0 402, the example power regulator responds to a load step change and increases input current of the input current waveform 410. In some implementations, the load step change causes the example power regulator to switch power regulation mode to an input current regulation mode. In some implementations, the input current regulation mode includes one or more of the first current limit 420 and the second current limit 422. In some implementations, the input current begins increasing toward the first current limit 420. In some implementations, the input current of the input current waveform 410 rises linearly in at least one of a DC component and an AC component between time t0 402 and t1 404. In some implementations, the step delay begins at time t0 402.

At time t1 404, the input current of the example power regulator reaches the first current limit 420 and continues increasing toward the first current overshoot level 430. In some implementations, as the input current continues increasing, it reaches the first current overshoot level 430 at a first current peak 440, and does not reach the second current overshoot level 432. In some implementations, the input current of the input current waveform 410 rises at a decreasing rate in at least one of a DC component and an AC component between time t1 404 and a subsequent time at which the input current reaches the first current overshoot level 430. In some implementations, at the first current peak 440, the input current stops increasing and its rate of rate is zero. In some implementations, the input current of the input current waveform 410 decreases at an increasing rate in at least one of a DC component and an AC component between the time at which the input current reaches the first current overshoot level 430 and a subsequent time at which the input current reaches the first current limit 420. In some implementations, the input current of the input current waveform 410 maintains a magnitude at or substantially equaling the first current limit 420 after decreasing to the first current limit 420. In some implementations, the step delay begins at time t1 404. In some implementations, the time period 412 between time t1 404 and time t2 406 is a first overshoot period during which the input current waveform 410 stabilizes at the first current limit 422 after a load step change.

At time t2 406, the input current of the example power regulator begins at the first current limit 420 and increases toward the second current overshoot level 432. In some implementations, the example power regulator switches a current limit from the first current limit 420 to the second current limit 422 at time t2 406. In some implementations, the example power regulator switches the current limit in response to expiration of a delay timer indicating the end of the time period 412 and the start of the time period 414. In some implementations, the time period 414 between time t2 406 and t3 408 is a second overshoot period during which the input current waveform 410 stabilizes at the second current limit 422 after a load step change.

In some implementations, as the input current continues increasing, it reaches the second current overshoot level 432 at a second current peak 442 above the first current overshoot level 430. In some implementations, the input current of the input current waveform 410 rises at a decreasing rate in at least one of a DC component and an AC component between time t2 406 and a subsequent time at which the input current reaches the second current overshoot level 432. In some implementations, at the second current peak 442, the input current stops increasing and its rate of rate is zero. In some implementations, the input current of the input current waveform 410 decreases at an increasing rate in at least one of a DC component and an AC component between the time at which the input current reaches the second current overshoot level 432 and a subsequent time at which the input current reaches the second current limit 422. In some implementations, the input current of the input current waveform 410 maintains a magnitude at or substantially equaling the second current limit 422 after decreasing to the second current limit 422.

At time t3 408, the example power regulator responds to a load step change opposite to the load step change at time t0 402. As one example, the load step change at time t3 408 can be a detachment, deactivation, or the like, of an electronic device, electrical device, or the like attached, activated, or the like at time t0 402. In some implementations, the input current decreases accordingly to the first current level or another current level below the first current limit 420. In some implementations, the input current decreases instantaneously or substantially instantaneously at time t3 408. After time t3 408, the input current of the input current waveform 410 maintains at the first current level.

Figure 5:
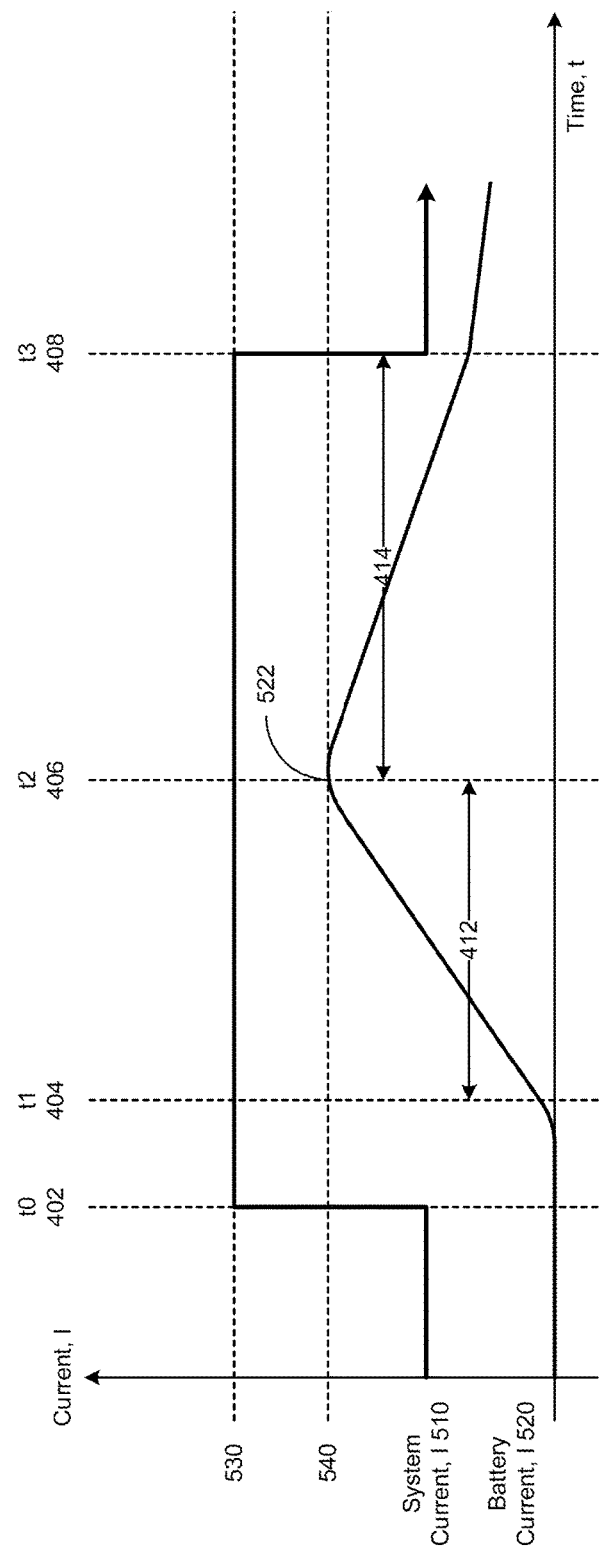
FIG. 5 illustrates an example timing diagram for system current and battery current further to the example timing diagram of FIG. 4.

FIG. 5 illustrates an example timing diagram for system current and battery current further to the example timing diagram of FIG. 4. As illustrated by way of example in FIG. 5, an example timing diagram 500 includes system current waveform 510, battery current waveform 520, a system peak current level 530, and a battery current peak level 540. It is to be understood that the timing diagram 500 illustrates an example response to an example operating state. It is to be further understood that the systems and devices in accordance with present implementations are not limited to operation in accordance with timing diagram 500 of FIG. 5.

Before time t0 402, a system current in accordance with the system current waveform 510 is at a first system current level, and a battery current in accordance with the battery current waveform 520 is at a first battery current level. In some implementations, the first system current is at a level below a battery peak current and a system peak current. In some implementations, the battery current is at a level substantially equal to zero, with no current flowing to the battery 108.

At time t0 402, the system current increases in response to the load step change that causes the example power regulator to switch power regulation mode to an input current regulation mode. In some implementations, the system current increases instantaneously or substantially instantaneously at time t0 402. In some implementations, the battery current maintains a level substantially equal to zero. In some implementations, the load step change at time t0 is caused at least partially by activating battery 108 to receiving charging power from the example power regulator. In some implementations, the example power regulator receives one or more commands to operatively couple the battery 108 to the output voltage node 204 by activating the battery transistor 208.

At time t1 404, the system current maintains at the system peak current level 530. In some implementations, the battery current increases at a decreasing rate beginning at time t1 404. In some implementations, the battery current increases toward a battery peak current 522. In some implementations, the battery current of the battery current waveform 520 rises at a decreasing rate in at least one of a DC component and an AC component between time t1 404 and a subsequent time at which the battery current reaches the battery current peak level 540.

At time t2 406, the battery current reaches the battery current peak 522, and the battery current stops increasing with its rate of change is zero. In some implementations, the battery current of the battery current waveform 520 decreases at a decreasing rate in at least one of a DC component and an AC component between time t2 406 and t3 408. In some implementations, the system current of the system current waveform 510 maintains a magnitude at or substantially equaling the system peak current 530.

At time t3 408, the example power regulator responds to a load step change opposite to the load step change at time t0 402. As one example, the load step change at time t3 408 can be a detachment, deactivation, or the like, of the battery 108 attached, activated, or the like at time t0 402. In some implementations, the system current decreases accordingly to the first system current level or another current level below the system peak current level 530. In some implementations, the system current decreases instantaneously or substantially instantaneously at time t3 408. After time t3 408, the system current of the system current waveform 510 maintains its current level, and the battery current of the battery current waveform 520 decreases at a decreasing rate in at least one of a DC component and an AC component between time t2 406 and t3 408. In some implementations, the battery current decreases at a second decreasing rate after time t3 408 that is greater than the decreasing rate between time t2 406 and t3 408.

Thus, in some implementations, the example power regulator can reduce a total overshoot current in a system undergoing a load step change. As one example, an example power regulator can switch from an output voltage regulation mode to an input current regulation mode in response to the load step change. In this example, the example power regulator operates with an input voltage of 20 V, a system voltage of 12.6 V, a battery voltage of 12 V, and an initial battery charge current of 0 A. In this example, load current step response can differ based on a single current limit and multiple current limits in accordance with present implementations. In this example, the example power regulator switches from an output voltage regulation mode to an input current regulation mode in response to the load step change. Under an example single current limit in this example, a load current changes from 0.5 A to 6 A, with a single-step current limit of 3 A. In this example, an overshoot current peak is 4.3 A, causing a 1.3 A overshoot. In this example, the 1.3 A overshoot is a 44% rise over the current limit. Alternatively, under example multiple current limits in this example, a load current changes from 0.5 A to 6 A, with a first step current limit of 2.4 A and a second step current limit of 3 A. In this example, a first overshoot current peak is 3.4 A, causing a 1.0 A overshoot over the first current limit, and a second overshoot current peak is 3.3 A, causing a 0.3 A overshoot over the first current limit. In this example, the highest overshoot current is 3.4 A, having a 1.4 A overshoot over the second current limit of 3.0 A. In this example, the overshoot is a 14% rise over the current limit. Thus, in this example, a two-step current limit results in an overshoot current total decrease of 0.9 A, and a difference in percentage decrease in overshoot of 30% between the single step current limit and the two-step current limit.

As another example, an example power regulator can switch from an battery current regulation mode to an input current regulation mode in response to the load step change. In this example, the example power regulator operates with an input voltage of 20 V, a system voltage of 12.6 V, a battery voltage of 12 V, and an initial battery charge current of 2 A. In this example, load current step response can differ based on a single current limit and multiple current limits in accordance with present implementations. Under an example single current limit in this example, a load current changes from 0.5 A to 6 A, with a single-step current limit of 3 A. In this example, an overshoot current peak is 4.2 A, causing a 1.2 A overshoot. In this example, the 1.2 A overshoot is a 40% rise over the current limit. Alternatively, under example multiple current limits in this example, a load current changes from 0.5 A to 6 A, with a first step current limit of 2.4 A and a second step current limit of 3 A. In this example, a first overshoot current peak is 2.8 A, causing a −0.2 A overshoot over (or 0.2 A undershoot under) the first current limit, and a second overshoot current peak is 3.2 A, causing a 0.2 A overshoot over the first current limit. In this example, the highest overshoot current is 3.2 A, having a 0.2 A overshoot over the second current limit of 3.0 A. In this example, the overshoot is a 7% rise over the current limit. Thus, in this example, a two-step current limit results in an overshoot current total decrease of 1.0 A, and a difference in percentage decrease in overshoot of 33% between the single step current limit and the two-step current limit.

Figure 6:
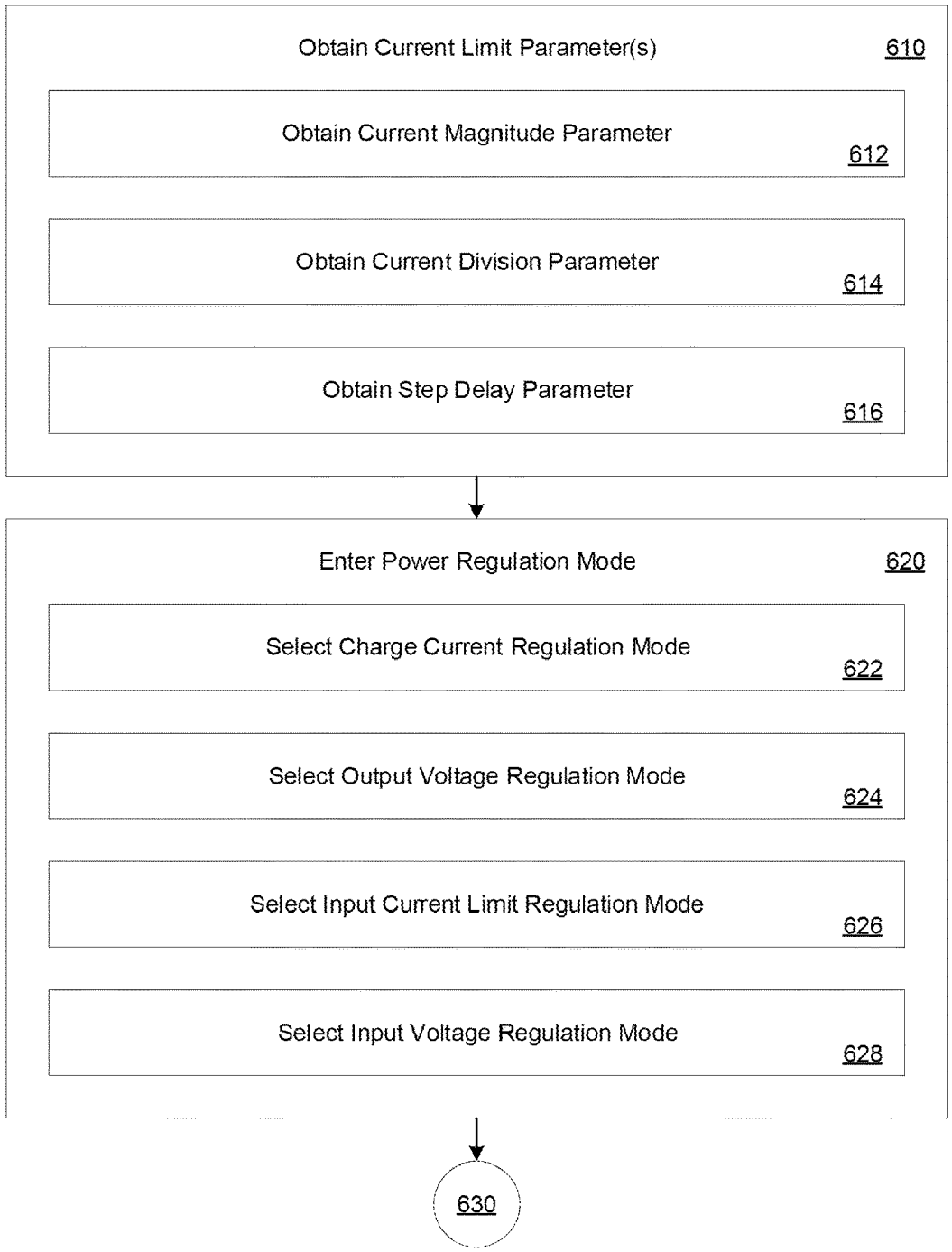
FIG. 6 illustrates an example method of reducing current overshoot in an example power regulator, in accordance with present implementations.

FIG. 6 illustrates an example an example method of reducing current overshoot in an example power regulator, in accordance with present implementations. In some implementations, at least one of the example power regulator system 100 and the example power regulator device 200 performs method 600 according to present implementations. In some implementations, the method 600 begins at step 610.

At step 610, the example system obtains at least one current limit parameter. In some implementations, the loop selector 110 obtains the current limit parameter from the current limit controller 120. In some implementations, step 610 includes at least one of steps 612, 614 and 616. At step 612, the example system obtains at least one current magnitude parameter. In some implementations, the loop selector 110 obtains the current magnitude parameter from the limit magnitude controller 310. At step 614, the example system obtains at least one current division parameter. In some implementations, the loop selector 110 obtains the current division parameter from the step magnitude controller 320. At step 616, the example system obtains at least one step delay parameter. In some implementations, the loop selector 110 obtains the current magnitude parameter from the step delay controller 330. The method 600 then continues to step 620.

At step 620, the example system enters a power regulation mode. In some implementations, the example system enters a power regulation mode based on one or more predetermined operating criteria associated with one or more system loads operatively coupled to the output node 204. As one example, operating criteria can include predetermined current or voltage levels associated with one or more peripherals operatively coupled to or integrated with the example system. In some implementations, step 620 includes at least one of steps 622, 624, 626 and 628. At step 622, the example system selects a charge current regulation mode. In some implementations, the charge current regulation mode causes the charger 106 to supply a particular charge current to the output node 204. In some implementations, the charger 106 operates in the charge current regulation mode by switching of one or more of the transistors 212, 214, 216 and 218 in accordance with the one or more of a buck mode, a boost mode, and a buck-boost mode of operation. At step 624, the example system selects an output voltage regulation mode. In some implementations, the output voltage regulation mode causes the charger 106 to supply a particular output voltage to the output node 204. In some implementations, the charger 106 operates in the output voltage regulation mode by switching of one or more of the transistors 212, 214, 216 and 218 in accordance with the one or more of a buck mode, a boost mode, and a buck-boost mode of operation. At step 626, the example system selects an input current limit regulation mode. In some implementations, the input current limit regulation mode causes the charger 106 to maintain a particular input current limit at the input node 202. In some implementations, the charger 106 operates in the input current limit regulation mode by switching of one or more of the transistors 212, 214, 216 and 218 in accordance with the one or more of a buck mode, a boost mode, and a buck-boost mode of operation. At step 628, the example system selects an input voltage regulation mode. In some implementations, the input voltage regulation mode causes the charger 106 to maintain a particular input voltage at the input node 202. In some implementations, the charger 106 operates in the input voltage regulation mode by switching of one or more of the transistors 212, 214, 216 and 218 in accordance with the one or more of a buck mode, a boost mode, and a buck-boost mode of operation. In some implementations, the method 600 then continues to step 630.

Figure 7:
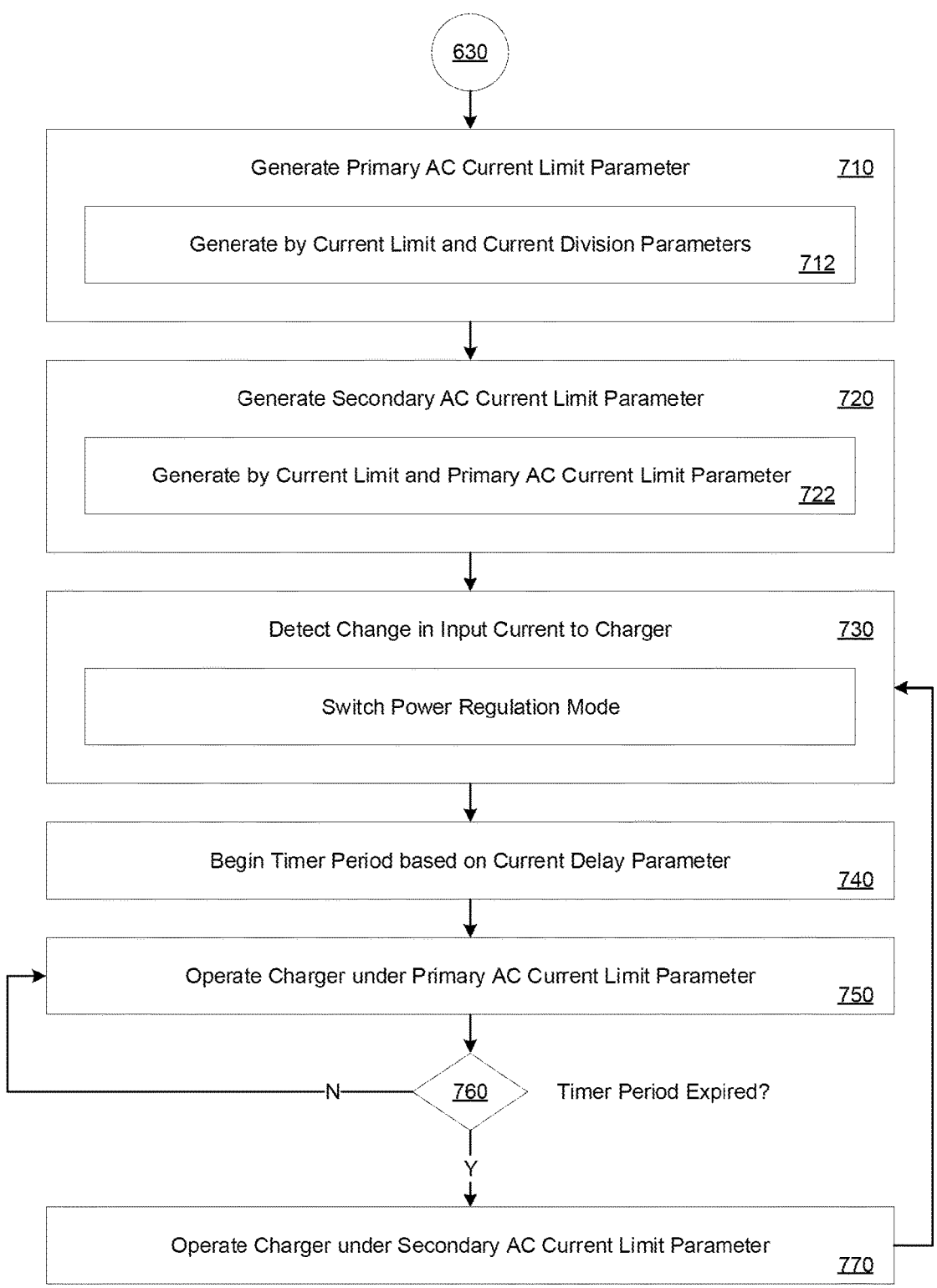
FIG. 7 illustrates an example method of reducing current overshoot in an example power regulator further to the example method of FIG. 6.

FIG. 7 illustrates an example method of reducing current overshoot in an example power regulator further to the example method of FIG. 6. In some implementations, at least one of the example power regulator system 100 and the example power regulator device 200 performs method 700 according to present implementations. In some implementations, the method 700 begins at step 630. The method 700 then continues to step 710.

At step 710, the example system generates a primary current limit parameter. In some implementations, the primary current limit parameter includes a limit on at least one of a DC current and an AC current magnitude. In some implementations, the primary current limit parameter is lower than a total current limit parameter stored by or associated with at least one of the current limit controller 120 and the limit magnitude controller 310. In some implementations, at least one of the current limit controller 120 and the limit magnitude controller 310 generates the primary current limit parameter. In some implementations, step 710 includes step 712. At step 712, the example system generates the primary current limit parameter based at least on a current limit parameter and a current division parameter. In some implementations, at least one of the current limit controller 120 and the limit magnitude controller 310 divides the current limit parameter by the current division parameter, or divides the current limit parameter by a value equaling one minus the current division parameter. The method 700 then continues to step 720.

At step 720, the example system generates a secondary current limit parameter. In some implementations, the secondary current limit parameter includes a limit on at least one of a DC current and an AC current magnitude. In some implementations, the secondary current limit parameter is lower than a total current limit parameter stored by or associated with at least one of the current limit controller 120 and the limit magnitude controller 310. In some implementations, at least one of the current limit controller 120 and the limit magnitude controller 310 generates the secondary current limit parameter. In some implementations, step 720 includes step 722. At step 722, the example system generates the secondary current limit parameter based at least on a current limit parameter and the primary current limit parameter. In some implementations, at least one of the current limit controller 120 and the limit magnitude controller 310 divides the current limit parameter by the current division parameter, or divides the current limit parameter by a value equaling one minus the current division parameter opposite to the corresponding operation associated with the primary current limit parameter. Thus, in some implementations, a sum of the primary current limit parameter and the secondary current limit parameter equals the total current limit parameter. The method 700 then continues to step 730.

At step 730, the example system detects a change in an input current to a charger. In some implementations, the loop selector 110 detects the change by at least one of the charge current feedback line 220, the charge current sensor 222, the output voltage feedback line 230, the input current feedback line 240, the input current sensor 242, and the input voltage feedback line 250. In some implementations, step 730 includes step 732. At step 732, the example system switches from a first power regulation mode to a second power regulation mode. In some implementations, the first power regulation mode and the second power regulation mode are respectively different modes among the charge current regulation mode, the output voltage regulation mode, the input current limit regulation mode, and the input voltage regulation mode. The method 700 then continues to step 740.

At step 740, the example system begins a timer period based at least partially on a current delay parameter. In some implementations, at least one of the current limit controller, the step delay controller 330 and the loop selector 110 begins a timer period by a timer device integrated therewith, operatively coupled thereto, or associated therewith. The method 700 then continues to step 750.

At step 750, the example system operates the charger in accordance with the primary current limit parameter. In some implementations, the loop selector 110 operates the charger 106 in accordance with the primary current limit parameter. In some implementations, the example system operates the charger 106 in accordance with one or more states associated with at least one of the timing diagrams 400 and 500. The method 700 then continues to step 760.

At step 760, the example system determines whether the time period has expired. In some implementations, at least one of the current limit controller, the step delay controller 330 and the loop selector 110 determines whether the time period has expired in accordance with a timer device integrated therewith, operatively coupled thereto, or associated therewith. In accordance with a determination that the time period has not expired, the method 700 continues to step 750. Alternatively, in accordance with a determination that the time period has expired, the method 700 continues to step 770.

At step 770, the example system operates the charger in accordance with the secondary current limit parameter. In some implementations, the loop selector 110 operates the charger 106 in accordance with the secondary current limit parameter. In some implementations, the example system operates the charger 106 in accordance with one or more states associated with at least one of the timing diagrams 400 and 500. In some implementations, the method 700 ends at step 770. Alternatively, in some implementations, the method 700 then continues to step 730. In some implementations, the example system operates in a cyclic, continuous, repeating, standby, or like mode until receiving one or more instructions, commands, or the like to cease operation in accordance with a power regulation mode.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method of reducing current overshoot in a power regulator device, comprising:
    detecting a change in an input current of an inductive charger device in response to a change in load on the inductive charger device;
    modifying an operating state of the inductive charger device in accordance with a first input current limit parameter based on a total input current limit parameter and a current division parameter, in response to the detecting the change in the input current;
    operating the inductive charger device in accordance with the first input current limit during a current limit period subsequent to the detecting the change in the input current;
    modifying the operating state of the inductive charger device in accordance with a second input current limit parameter based on the total input current limit parameter and the current division parameter, subsequent to the current limit period; and
    operating the inductive charger device in accordance with the second input current limit subsequent to the current limit period.

2. The method of claim 1, further comprising:
    generating the first input limit current based on a first ratio of the total input current limit and the current division parameter.

3. The method of claim 1, further comprising:
    generating the second input limit current parameter based on a second ratio of the total input current limit parameter and the current division parameter.

4. The method of claim 1, further comprising:
    generating the second input limit current parameter based on a difference between total input current limit parameter and the first input current limit parameter.

5. The method of claim 1, further comprising:
    retrieving the total input current limit parameter and the current division parameter from a current limit controller integrated with the inductive charger device.

6. The method of claim 1, further comprising:
    switching a power regulation mode of the inductive charger device from a first power regulation mode to a second power regulation mode, in response to the detecting the change in the input current.

7. The method of claim 6, wherein the first power regulation mode is an output voltage regulation mode and the second power regulation mode is an input current limit regulation mode.

8. The method of claim 6, wherein the first power regulation mode is charge current regulation mode and the second power regulation mode is an input current limit regulation mode.

9. The method of claim 1, further comprising:
    retrieving a step delay parameter from a current limit controller integrated with the inductive charger device, wherein the current limit period is based on the step delay parameter.

10. A power regulator device comprising:
    an inductive charger device;
    a limit magnitude controller device operatively coupled to the inductive charger device and configured to modify an operating state of the inductive charger device in accordance with a first input current limit parameter in response to a change in an input current, the first input current parameter being based on a total input current limit parameter and a current division parameter;

a step magnitude controller device operatively coupled to the inductive charger device and configured to modify the operating state of the inductive charger device in accordance with a second input current limit parameter subsequent to the current limit period, the second input current limit parameter being based on the total input current limit parameter and the current division parameter; and a loop selector device operatively coupled to the inductive charger device, the limit magnitude controller device, and the step magnitude controller device, and configured to detect the change in the input current of the inductive charger device in response to a change in load on the inductive charger device, operate the inductive charger device in accordance with the first input current limit during a current limit period subsequent to the change in the input current, and operate the inductive charger device in accordance with the second input current limit subsequent to the current limit period.

11. The device of claim 10, wherein the limit magnitude controller device is further configured to:
generate the first input limit current based on a first ratio of the total input current limit and the current division parameter.

12. The device of claim 10, wherein the step magnitude controller device is further configured to:
generate the second input limit current parameter based on a second ratio of the total input current limit parameter and the current division parameter.

13. The device of claim 10, wherein the step magnitude controller device is further configured to:
generate the second input limit current parameter based on a difference between total input current limit parameter and the first input current limit parameter.

14. The device of claim 10, wherein the loop selector device is further configured to:
switch a power regulation mode of the inductive charger device from a first power regulation mode to a second power regulation mode, in response to the change in the input current.

15. The device of claim 14, wherein the first power regulation mode is an output voltage regulation mode and the second power regulation mode is an input current limit regulation mode.

16. The device of claim 14, wherein the first power regulation mode is charge current regulation mode and the second power regulation mode is an input current limit regulation mode.

17. The device of claim 10, further comprising:
a step delay device operatively coupled to the loop selector device and configured to retrievably store a step delay parameter,
wherein the current limit period is based on the step delay parameter.

18. The device of claim 17, wherein the limit magnitude controller device, the step magnitude controller device, and the step delay device are integrated into a current limit controller device.

19. A power regulator system comprising:
an inductive charger device;
a limit magnitude controller device operatively coupled to the inductive charger device and configured to modify an operating state of the inductive charger device in accordance with a first input current limit parameter in response to a change in an input current, the first input current parameter being based on a total input current limit parameter and a current division parameter;
a step magnitude controller device operatively coupled to the inductive charger device and configured to modify the operating state of the inductive charger device in accordance with a second input current limit parameter subsequent to the current limit period, the second input current limit parameter being based on the total input current limit parameter and the current division parameter;
a loop selector device operatively coupled to the inductive charger device, the limit magnitude controller device, and the step magnitude controller device, and configured to detect the change in the input current of the inductive charger device in response to a change in load on the inductive charger device, operate the inductive charger device in accordance with the first input current limit during a current limit period subsequent to the change in the input current, and operate the inductive charger device in accordance with the second input current limit subsequent to the current limit period; and
a step delay device operatively coupled to the loop selector device and configured to retrievably store a step delay parameter,
wherein the current limit period is based on the step delay parameter.

20. The system of claim 19, wherein the limit magnitude controller device, the step magnitude controller device, and the step delay device are integrated into a current limit controller device.

* * * * *